(12) United States Patent
Van De Vanter (10) Patent No.: US 7,117,479 B2
(45) Date of Patent: Oct. 3, 2006

(54) LANGUAGE-SENSITIVE WHITESPACE ADJUSTMENT IN A SOFTWARE ENGINEERING TOOL

(75) Inventor: Michael L. Van De Vanter, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 717 days.

(21) Appl. No.: 09/968,932

(22) Filed: Oct. 1, 2001

(65) Prior Publication Data

US 2003/0066058 A1    Apr. 3, 2003

(51) Int. Cl.
*G06F 9/44* (2006.01)

(52) U.S. Cl. ............ 717/114; 717/124; 717/143
(58) Field of Classification Search ........ 717/114–117, 717/124–129, 118, 140–143
See application file for complete search history.

(56) References Cited

U.S. PATENT DOCUMENTS

| | | | |
|---|---|---|---|
| 4,809,170 A | 2/1989 | Leblang et al. | |
| 4,931,928 A | 6/1990 | Greenfeld | |
| 4,989,145 A | 1/1991 | Kyushima | |
| 5,006,992 A | 4/1991 | Skeirik | |
| 5,070,478 A | 12/1991 | Abbott | |
| 5,079,700 A | 1/1992 | Kozoll et al. | |
| 5,140,521 A | 8/1992 | Kozol et al. | |
| 5,239,298 A | 8/1993 | Wei | |
| 5,263,174 A | 11/1993 | Layman | |
| 5,287,501 A | 2/1994 | Lomet | |
| 5,293,629 A * | 3/1994 | Conley et al. ............... | 717/154 |
| 5,311,422 A | 5/1994 | Loftin et al. | |
| 5,313,387 A | 5/1994 | McKeeman et al. | |
| 5,377,318 A | 12/1994 | Wolber | |
| 5,430,836 A | 7/1995 | Wolf et al. | |
| 5,481,711 A | 1/1996 | Sotani | |
| 5,481,712 A | 1/1996 | Silver et al. | |
| 5,485,618 A | 1/1996 | Smith | |
| 5,493,678 A * | 2/1996 | Arcuri et al. .................. | 707/1 |
| 5,502,805 A * | 3/1996 | Anderson et al. ........... | 715/503 |
| 5,513,305 A * | 4/1996 | Maghbouleh ............... | 715/500 |
| 5,537,630 A | 7/1996 | Berry et al. | |
| 5,557,730 A | 9/1996 | Frid-Nielsen | |
| 5,577,241 A | 11/1996 | Spencer | |
| 5,579,469 A | 11/1996 | Pike | |
| 5,583,762 A | 12/1996 | Shafer | |
| 5,604,853 A | 2/1997 | Nagashima | |
| 5,627,958 A | 5/1997 | Potts et al. | |
| 5,628,016 A | 5/1997 | Kukol | |

(Continued)

OTHER PUBLICATIONS

Thiemann, "Grammar based analysis of string expressions", ACM TLDI, pp 59-70, 2005.*

(Continued)

*Primary Examiner*—Anil Khatri
(74) *Attorney, Agent, or Firm*—Zagorin O'Brien Graham LLP (57) ABSTRACT

An editor or software engineering tool may be configured to render whitespace between adjacent tokens, wherein the amount of whitespace between any two adjacent tokens is determined according to language-specific style rules and scaled in accordance with display considerations. In some realizations, the operative scaling is selected or defined by a user according to the user's visual preferences. In some realizations, the operative scaling relates to requirements or constraints of an automated layout mechanism. For example, a particular scaling may be calculated to adjust line length in conformance with a desired margin alignment or to optimize layout when long lines are automatically wrapped (or folded) in some automatic way.

19 Claims, 4 Drawing Sheets

U.S. PATENT DOCUMENTS

| | | | |
|---|---|---|---|
| 5,644,737 | A | 7/1997 | Tuniman et al. |
| 5,649,192 | A | 7/1997 | Stucky |
| 5,649,222 | A | 7/1997 | Mogilevsky |
| 5,671,403 | A | 9/1997 | Shekita et al. |
| 5,673,390 | A | 9/1997 | Mueller |
| 5,680,619 | A | 10/1997 | Gudmundson et al. |
| 5,680,630 | A | 10/1997 | Saint-Laurent |
| 5,694,559 | A | 12/1997 | Hobson et al. |
| 5,724,593 | A | 3/1998 | Hargrave, III et al. |
| 5,734,749 | A | 3/1998 | Yamada et al. |
| 5,737,608 | A | 4/1998 | Van De Vanter |
| 5,740,444 | A | 4/1998 | Frid-Nielsen |
| 5,748,975 | A | 5/1998 | Van De Vanter |
| 5,752,058 | A * | 5/1998 | Van De Vanter ............. 715/531 |
| 5,754,737 | A | 5/1998 | Gipson |
| 5,781,720 | A | 7/1998 | Parker et al. |
| 5,790,778 | A | 8/1998 | Bush et al. |
| 5,798,757 | A | 8/1998 | Smith |
| 5,802,262 | A * | 9/1998 | Van De Vanter ............... 714/1 |
| 5,805,889 | A | 9/1998 | Van De Vanter |
| 5,813,019 | A | 9/1998 | Van De Vanter |
| 5,825,355 | A | 10/1998 | Palmer et al. |
| 5,844,554 | A | 12/1998 | Geller et al. |
| 5,845,120 | A | 12/1998 | Reddy et al. |
| 5,845,300 | A | 12/1998 | Comer et al. |
| 5,850,561 | A | 12/1998 | Church et al. |
| 5,857,212 | A | 1/1999 | Van De Vanter |
| 5,859,638 | A | 1/1999 | Coleman et al. |
| 5,870,608 | A | 2/1999 | Gregory |
| 5,872,974 | A | 2/1999 | Mezick |
| 5,877,758 | A | 3/1999 | Seybold |
| 5,890,103 | A * | 3/1999 | Carus ............................ 704/9 |
| 5,905,892 | A | 5/1999 | Nielsen et al. |
| 5,911,059 | A | 6/1999 | Profit, Jr. |
| 5,911,075 | A | 6/1999 | Glaser et al. |
| 5,924,089 | A | 7/1999 | Mocek et al. |
| 5,959,629 | A | 9/1999 | Masui |
| 5,990,906 | A | 11/1999 | Hudson et al. |
| 6,012,075 | A | 1/2000 | Fein et al. |
| 6,016,467 | A | 1/2000 | Newsted et al. |
| 6,018,524 | A | 1/2000 | Turner et al. |
| 6,023,715 | A | 2/2000 | Burkes et al. |
| 6,026,233 | A | 2/2000 | Shulman et al. |
| 6,053,951 | A | 4/2000 | McDonald et al. |
| 6,061,513 | A | 5/2000 | Scandura |
| 6,071,317 | A | 6/2000 | Nagel |
| 6,115,544 | A | 9/2000 | Mueller |
| 6,119,120 | A | 9/2000 | Miller |
| 6,154,847 | A | 11/2000 | Schofield et al. |
| 6,163,879 | A | 12/2000 | Mackey |
| 6,185,591 | B1 | 2/2001 | Baker et al. |
| 6,205,579 | B1 | 3/2001 | Southgate |
| 6,226,785 | B1 | 5/2001 | Peterson et al. |
| 6,247,020 | B1 | 6/2001 | Minard |
| 6,266,665 | B1 | 7/2001 | Vaidyanathan et al. |
| 6,275,976 | B1 | 8/2001 | Scandura |
| 6,282,551 | B1 * | 8/2001 | Anderson et al. ........... 715/503 |
| 6,286,138 | B1 | 9/2001 | Purcell |
| 6,470,306 | B1 * | 10/2002 | Pringle et al. .................. 704/3 |
| 6,470,349 | B1 * | 10/2002 | Heninger et al. ........... 707/102 |
| 6,601,026 | B1 * | 7/2003 | Appelt et al. ................... 704/9 |
| 6,658,624 | B1 * | 12/2003 | Savitzky et al. ............. 715/513 |
| 6,760,695 | B1 * | 7/2004 | Kuno et al. ..................... 704/9 |

OTHER PUBLICATIONS

Pearl, "Packrat, parsing, simple, powerful, lazy, linear time", ACM ICFP, pp 36-47, 2002.*

Ford, "Parsing expression grammars: a recognition based syntactic foundation", ACM POPL, pp 111-122, 2004.*

Reps, "Maximal munch tokenization in linear", ACM Trans. on Prog. Lang & Sys. vol. 20, No. 2, pp 259-273, 1998.*

R.M. Baecker and Aaron Marcus, "Human Factors and Typography for More Readable Programs", ACM Press, 1990, p. 334.

Bahlke, Rolf. et al., "The PSG System: From Formal Language Definitions to Interactive Programming Environments," ACM Transactions on Programming Languages and Systems, vol. 8, No. 4 (Oct. 1986) pp. 547-576.

Ballance, R.A., et al., "The Pan Language-Based Editing System," ACM Transactions on Software Engineering and Methodology, vol. 1, No. 1 (Jan. 1992) pp. 95-127.

Borras, P., et al., "Centaur: the system," ACM Sigsoft Software Engineering Notes, ACM Sigplan Notices, Proceedings of the Third ACM Sigsoft/Sigplan Software Engineering Symposium on Practical Software Development Environments, vol. 13, 24 issue 5 (Nov. 1988) pp. 14-24.

Carrano, Frank, et al., "Data Abstraction and Problem Solving with C++, Walls and Mirrors", Second Edition, Addison-Wesley, Chapter 4 (Aug. 1998) pp. 147-214.

Conner, M.H., et al., "Undo Model", IBM Technical Disclosure Bulletin, vol. 36, No. 11 (Nov. 1993) pp. 85-87.

Crowley, Charles, "Data Structures for Text Sequences", accessed on Sept. 22, 2005 at <http://citeseer.ist.psu.edu/crowley98data.html> (Jun. 27, 1996) pp.1-29.

Donzeau-Gouge, V. et al., "Programming Environments Based on Structured Editors: The MENTOR Experience, " Technical Reports 26, Institute National de Recherche en Informatique et Automatique Rocquencourt (Jul. 1980) pp. 128-140, France.

Finseth, Craig A., "The Craft of Text Editing, Emacs for the Modern World," Springer-Verlag (1991) New York, USA.

Franke, III, Charles H., et al., "Authoring a Hypertext UNIX Help Manual," ACM (1995) pp. 238-245.

Friendly, Lisa, "The Design of Distributed Hyperlinked Programming Documentation," Proceedings of the International Workshop on Hypermedia Design (Jun. 1-2, 1995) pp. 151-173, France.

Jordan, Mick, et al., "Software Configuration Management in an Object Oriented Database," Proceedings of the USENIX Conference on Object-Oriented Technologies (COOTS) (Jun. 1995) 13 pages, Monterey, CA.

Jordan, Mick, et al., "Modular System Building with Java™ Packages," Conference on Software Engineering Environments (Apr. 8-9, 1997) pp. 47-51, Germany.

Lang, Bernard, "On the Usefulness of Syntax Directed Editors," Advanced Programming Environments, Proceedings of an International Workshop, Lecture Notes in Computer Science, vol. 244, Reidar Conradi et al, editors, Springer Verlag (Jun. 16-18, 1986) pp. 47-51, Trondheim, Norway.

Letovsky, S., et al., "Delocalized Plans and Program Comprehension," IEEE Software (May 1986) pp. 41 49.

McFedries, Paul, "Visual Basic for Applications Unleashed," Sams MacMillian Computer Publishing, ISBN 0672310465 (Mar. 21, 1997) (excerpts), 32 pages.

Meyrowitz, et al., "Interactive Editing Systems: Part I," ACM Computing Surveys, vol. 14, No. 3 (Sept. 1982) pp. 321-352.

Meyrowitz, et al., "Interactive Editing Systems: Part II," ACM Computing Surveys, vol. 14, No. 3 (Sept. 1982) pp. 353-415.

Murer, Tobias, et al., "Replacing Copies with Connections: Managing Software across the Virtual Organization," IEEE 8th International Workshop on Enabling Technologies: Infrastructure for Collaborative Enterprises (Jun. 16-19. 1999) 8 pages, Stanford University, California.

Neal, Lisa Rubin, "Cognition-Sensitive Design and User Modeling for Syntax-Directed Editors," Proceedings of the SIGCHI/GI Conference on Human Factors in Computing Systems and Graphics Interface, ACM Press (1986) pp. 99-102, New York, NY.

Notkin, David, "The GANDALF Project," Journal of Systems and Software, vol. 5, No. 2 (May 1985) pp. 91-105.

Ramsey, Norman, "Literate Programming Simplified," IEEE Software, vol. 11, issue 5 (Sept. 1994), pp. 97-105.

Reps. T., et al., "The Synthesizer Generator Reference Manual," Third Edition, "Texts and Monographs in Computer Science," (Dec. 1988) 180 pages.

Reps, Thomas, "Maximal-Munch' Tokenization in Linear Time," ACM Transactions on Programming Languages and Systems, vol. 20, issue 2, ACM Press (Mar. 1998) pp. 259-273, USA.

Sevoir, Martin, "Re: UCS-2 vs. UCS-4", abiword-dev mailing list archive, (Jun. 23, 2001) 4 pages, accessed on Sept. 23, 2005 at <http://www.abisource.com/mailinglists/abiword-dev/01/june/0610.html>.

Simonis, Volker, "ProgDoc—A Program Documentation System," in Lecture Notes in Computer Science 2890, Andrei Ershov 5rd. Intern. Conf. "Perspectives of System Informatics," (Jul. 9-12, 2003) pp. 438-449, Novosibirsk, Russia.

Soloway, E., et al., "Empirical Studies of Programming Knowledge," IEEE Transactions on Software Engineering, vol. SE-10, No. 5 (Sept. 1984) pp. 595-609.

Stallman, Richard M., "EMACS: The Extensible, Customizable, Self-Documenting Display Editor,"Proceedings of the ACM-Sigplan Sigoa Symposium on Text Manipulation, Sigplan Notices, vol. 16, No. 6 (Jun. 8-10, 1981) pp. 147-156, Portland, OR.

Teitelbaum, T., et al., "The Cornell Program Synthesizer: A Syntax-Directed Programming Environment," Communications of the ACM, vol. 24, No. 9 (Sept. 1981) pp. 563-573.

Van de Vanter, Michael L., "Biblio Text Version 5.0: A Hypertext Browser for Bibliographic Data and Notes," University of California Berkeley Technical Report No. UCB/CSD 90/603 (Nov. 1990) pp. 1-39.

Van de Vanter, M. et al., "Coherent User Interfaces for Language-Based Editing Systems," University of California Berkeley Technical Report No. UCB/CSD 90/591, pp. 431-466 (reprinted in Structure-Based Editors and Environments, Gerd Szwillus and Lisa Neal Eds., Academic Press, 1996 (Jul. 1990) pp. 19-69).

Van de Vanter, Michael L., "User Interaction in Language-Based Editing Systems," University of California Berkeley Technical Report No. UCB/CSD 93/726 (Dec. 1992) pp. 1-157.

Van de Vanter, Michael L., "Practical Language-Based Editing for Software Engineers," Software Engineering and Human-Computer Interaction: ICSE '94 Workshop on SE-HCI: Joint Research Issues (May 1994) 17 pages, Sorrento, Italy.

Van de Vanter, Michael L., "Coordinated Editing of Versioned Packages in the JP Programming Environment," Eighth International Symposium on System Configuration Management (Jul. 20-21, 1998) pp. 1-16, Brussels, Belgium.

Van de Vanter, Michael L., et al., "Global Names: Support for Managing Software in a World of Virtual Organizations," Ninth International Symposium on System Configuration Management (Sept. 5-7, 1999) pp. 1-15, Toulouse, France.

Van de Vanter, Michael L., et al., "Displaying and Editing Source Code in Software Engineering Environments," Second International Symposium on Constructing Software Engineering Tools (Jun. 5, 2000) 10 pages, Limerick, Ireland.

* cited by examiner

LANGUAGE-SENSITIVE WHITESPACE ADJUSTMENT IN A SOFTWARE ENGINEERING TOOL

CROSS-REFERENCE TO RELATED APPLICATION(S)

BACKGROUND

1. Field of the Invention

The present invention relates generally to interactive software engineering tools including editors for source code such as a programming or mark-up language, and more particularly to a language-based editing architecture with support for whitespace adjustment under user or program control.

2. Description of the Related Art

In an editor for computer programs, it may be desirable to adjust the horizontal length of displayed lines of source code. For example, a user may require, or simply prefer, a more spacious layout in order to read comfortably. Alternatively, a user may wish to see more information in a fixed amount of space. In some implementations, it may be desirable to adjust line length in conformance with a desired margin alignment (as in word processor paragraphs) or to optimize layout when long lines are wrapped (or folded) in some automatic way.

Whatever the motivation, it has generally been found that, to avoid degrading display legibility and distracting the user, adjustments to display length of lines are often best performed by adjusting the whitespace in the rendered text, rather than changing the rendering of the text elements themselves. For example, word processors commonly use whitespace adjustment in the presentation of fully justified text.

In contrast with the information manipulated and rendered by text-oriented editors such as a word processor, computer programs tend to exhibit a structural content that advanced software engineering tools may consider in their functionality or behavior. For example, computer program editors often attempt to highlight certain constructs such as keywords, conditions, grouping constructs (such as parenthesis or braces), etc. Other examples of language-oriented behavior include "prettyprinting." Over the years, several approaches have been employed to provide language-oriented features in software engineering tools. Some tools, such as the GNU Emacs editor familiar to many programmers, take a text-oriented approach based on regular expression matching to provide language-specialized services. Others, particularly in research systems, have employed structure-based approaches. See e.g., Tim Teitelbaum and Thomas Reps, *The Cornell Program Synthesizer: A Syntax-Directed Programming Environment*, Communications of the ACM, 24, 9, pp. 563–573 (1981). Most practical systems attempt to combine aspects of the two approaches.

Indeed, applicant's U.S. Pat. No. 5,748,975, entitled "SYSTEM AND METHOD FOR TEXTUAL EDITING OF STRUCTURALLY-REPRESENTED COMPUTER PROGRAMS WITH ON-THE-FLY TYPOGRAPHICAL DISPLAY," discloses an especially user-friendly editor for structurally represented computer programs. That editor combined aspects of text and structure editors by transforming the event stream typed by a user into a token stream, where tokens of the token stream constituted elements of the program being entered. Each token was classified by the editor as corresponding to a group of extended lexemes defined by the language in which the program under edit was written. The editor prettyprinted a program as the user typed, using information in the token stream, and further allowed the user to edit the program from the prettyprinted display as though the program were internally represented as text.

Applicant's U.S. Pat. No. 5,752,058, entitled "SYSTEM AND METHOD FOR INTER-TOKEN WHITESPACE REPRESENTATION AND TEXTUAL EDITING BEHAVIOR IN A PROGRAM EDITOR," improves upon the aforementioned techniques for displaying code. Based on information in the token stream, the disclosed editor prettyprinted the program as the user types. In some realizations disclosed, the prettyprinting step involved typesetting each of the tokens in a visually distinct manner and displaying a selected amount of visual whitespace between the tokens based on the lexical types of the tokens.

However notwithstanding the advantages provided by an editor according to either or both of the '975 and '058 patents, a user staring at a display while entering and editing text can still become visually fatigued. Thus, while conventional prettyprinting can make entering and editing computer program code somewhat less fatiguing, there is still a need for techniques to further enhance or vary a language-based display.

SUMMARY

Accordingly, it has been discovered that an editor or software engineering tool may be configured to render whitespace between adjacent tokens, wherein the amount of whitespace between any two adjacent tokens is determined according to language-specific style rules and scaled in accordance with display considerations. In some realizations, the operative scaling is selected or defined by a user according to the user's visual preferences. In some realizations, the operative scaling relates to requirements or constraints of an automated layout mechanism. For example, a particular scaling may be calculated to adjust line length in conformance with a desired margin alignment or to optimize layout when long lines are automatically wrapped (or folded) in some automatic way.

In one embodiment in accordance with the present invention, a software engineering tool recognizes language tokens and computes for display whitespace amounts between adjacent instances thereof according to language-specific style rules. The software engineering tool further provides, for at least a grouping of those language tokens displayed, dynamic adjustment of the computed whitespace amounts in accordance with an operative scaling factor therefor.

In another embodiment in accordance with the present invention, a method of presenting textual content that includes a sequence of tokens recognizable in accordance with a predefined language model includes calculating whitespace amounts for visual presentation between adjacent pairs of recognized tokens, wherein the calculated whitespace amount for visual presentation between a first pair of the tokens differs from that between a second pair of the tokens, each in accordance with language-specific style rules; and for at least a subset of the token sequence, applying an operative scaling factor in the calculating of respective ones of the whitespace amounts.

In another embodiment in accordance with the present invention, a process for visual whitespace representation and cursor behavior in a software engineering tool configured to represent a computer program as a sequence of tokens includes displaying each line of the computer program as it is entered by a user, wherein a displayed line includes a portion of the sequence of tokens and visual whitespace separating adjacent ones thereof, and wherein width of a particular instance of visual whitespace is based on (i) lexical type of at least one respective token adjacent thereto and (ii) an operative scaling factor, such that, for a given view, the width of each instance of visual whitespace is language sensitive and modulated in accordance with the operative scaling factor. The method further includes displaying a cursor in the displayed line of the computer program, the cursor having a cursor position corresponding to an insertion point in the sequence.

In still another embodiment in accordance with the present invention, a computer program product including instructions encoded at least one computer readable medium and executable on a processor. The computer program product includes first and second functional sequences. The first functional sequence of the instructions directs the processor to calculate a sizing for a particular instance of whitespace to be displayed adjacent to a particular display element corresponding to a language token recognized in a sequence thereof, the calculated sizing being at least a function of the recognized language token. The second functional sequence of the instructions directs the processor to calculate an adjustment to the sizing, the adjustment being in accordance with an operative scaling factor.

In still yet another embodiment in accordance with the present invention, an apparatus includes storage for a computer readable encoding of information represented as a sequence of tokens, means for preparing a visual representation of the token sequence as display elements separated by whitespace, wherein sizing of a particular instance of the whitespace is in accordance with (i) the tokens adjacent thereto and (ii) an operative scaling factor, and means for adjusting the operative scaling factor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Exploitations of the techniques of the present invention are many. In particular, a wide variety of software engineering tools that employ aspects of the present invention to facilitate language-sensitive whitespace adjustment are envisioned. One exemplary software engineering tool with language-oriented behavior is a source code editor that provides advanced program typography based on lexical context. Such a source code editor provides a useful descriptive context in which to present various aspects of the present invention. Nonetheless, the invention is not limited thereto. Indeed, applications to editors, analyzers, builders, compilers, debuggers and other such software engineering tools are envisioned. In this regard, some exploitations of the present invention may provide language-oriented behaviors within suites of tools or within tools that provide functions in addition to manipulation of program code.

In addition, while traditional procedural or object-oriented programming languages provide a useful descriptive context, exploitations of the present invention are not limited thereto. Indeed, other software engineering tool environments such as those adapted for editing, analysis, manipulation, transformation, compilation, debugging or other operations on functionally descriptive information or code, such as other forms of source code, machine code, bytecode sequences, scripts, macro language directives or information encoded using markup languages such as HTML or XML, may also employ structures, methods and techniques in accordance with the present invention. Furthermore, the structures, methods and techniques of the present invention may be exploited in the manipulation or editing of non-functional, descriptive information, such as software documentation or even prose, as long as rendered whitespace is a function of lexical context and an operative scaling. Based on the description herein, persons of ordinary skill in the art will appreciate applications to a wide variety of tools and language contexts.

Accordingly, in view of the above and without limitation, an exemplary exploitation of the present invention is now described.

Exemplary Editor Implementation

In general, techniques of the present invention may be implemented using any of a variety of editor implementations. Nonetheless, for purposes of illustration, description of an exemplary set of editor implementations in U.S. Pat. No. 5,752,058, entitled "SYSTEM AND METHOD FOR INTER-TOKEN WHITESPACE REPRESENTATION AND TEXTUAL EDITING BEHAVIOR IN A PROGRAM EDITOR" is incorporated herein by reference. Based on the description herein, including the above-incorporated description, persons of ordinary skill in the art will appreciate a variety of editor implementations that may benefit from features and techniques of the present invention.

Figure 1:
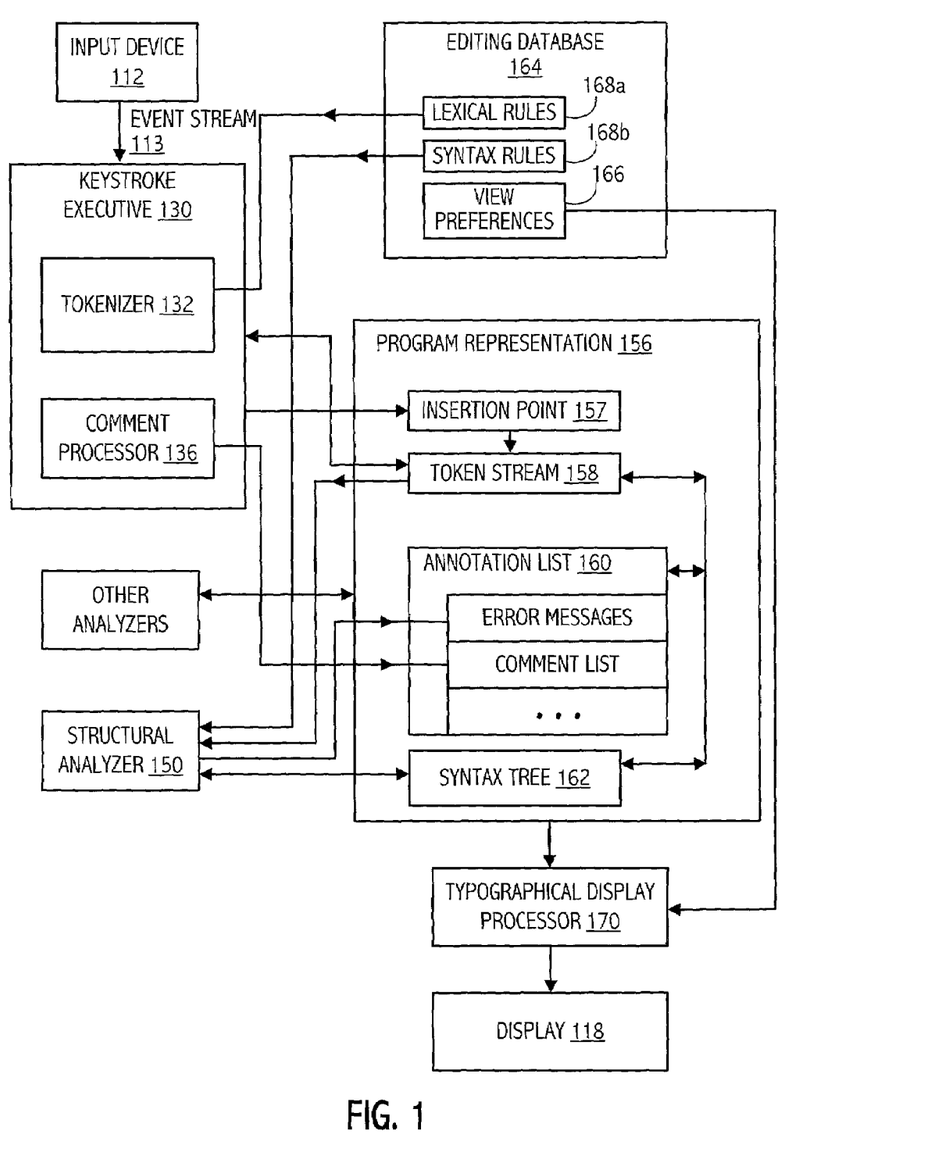
FIG. 1 depicts an exemplary interactive editor environment that provides textual display with inter-token whitespace amounts based on the recognized lexical types of adjacent tokens, and which is one suitable implementation environment for an adjustable whitespace embodiment of the present invention.

FIG. 1 depicts interactions between various functional components of an editor implementation such as that disclosed in the above-incorporated '058 patent. In particular, FIG. 1 illustrates aspects of, and functional relationships between, an input device 112, editing routines 130, 150, 170, a program representation 156, an editing database 164, typographic display processor 170 and display 118. The illustrated functional relationships are typical of those exhibited the course of editing computer code (not separately shown). As will be described herein, operation of routines or other functionality implementing typographic display processor 170 provide language-sensitive whitespace that is adjustable in response to an operative scaling, such as a user preference or layout constraint.

In the illustrated editor implementation, a user edits the program by interacting, through input device 112, with the displayed version 118 of the program being edited. In implementations where input device 112 includes a keyboard, these interactions may include keystrokes directing the editor to update insertion point 157 (e.g., in response to use of cursor control keys), insert a space at a current insertion point (e.g., in response to spacebar use), delete the editable element to the left or right of the cursor, insert a character at the cursor (upon typing), or break the current line (e.g., in response to use of the enter key). If the input device 112 also includes a mouse, interactions may also include various types of mouse clicks, selections and/or menu operations. The input device relays interactions, or input events, to the keystroke executive 130 as an event stream 113. In general, during operation of the editor implementation, the state of program representation 156 includes accumulated contributions of keystroke executive 130 and any program code loaded from file or other storage (not shown).

Tokenizer 132 is of any suitable design that, based on lexical rules 168a, identifies tokens in program representation 156. Because changes to the state of program representation 156 are responsive to event stream 113, typical implementations place tokenizer or lexical analysis functions under control of keystroke executive 130. Nonetheless, in other software engineering tool implementations, particularly those that emphasize display, rather than editing of program code, lexical analysis may be more closely linked with other functionality. In some variations, language specific tokenizers (not specifically shown) may be provided to handle embedded lexical contexts such as for comments, strings, scripts etc. In such cases, token stream 158 includes tokens recognized in accordance with the various operative lexical contexts. In some variations, certain content such as comments may be separately processed (e.g., by comment processor 136) and represented as part of program representation 156 as annotations (see annotation list 160) or other ancillary data. In some realizations, structural (e.g., syntactic) analysis 150 may be performed and program representation 156 may include a syntax tree 162 or other similar component of the tokenized program representation.

Whatever the tokenized representation of program code, typographic display processor 170 provides a corresponding language-sensitive rendition using display 118. Above-incorporated U.S. Pat. No. 5,752,058 describes in detail one suitable implementation of typographic display processor 170 functionality in which lexical information (and in some cases syntactic information) is used to determine the display attributes of textual content. In particular, FIG. 5 and the related description from the above-incorporated U.S. Patent detail a system in which certain typographic attributes are encoded as token display rules and contents of a whitespace display table. In at least some embodiments described, the whitespace display table associates one of four fixed spacings with particular pairs of token classes to facilitate lookup of an appropriate spacing for adjacent token instances. In one exemplary embodiment, fixed spacings are selected from the set, {none, small, average, wide}, and are applied to particular pairs of adjacent token instances based on token classes.

For purposes of some embodiments of the present invention in which variable amount of whitespace between adjacent tokens is determined according to language-specific style rules and scaled in accordance with display considerations (whether user-oriented display considerations, layout-oriented display considerations or otherwise), any of a variety of mechanisms for token recognition, assignment of typographic attributes or selection of a base whitespace amount are suitable. The implementation described above is but one such implementation. Preferably, whitespace between tokens is not explicitly represented in token stream 158, but rather, is implicitly coded by language-specific display rules, for example using a table that maps adjacent token pairings (or token type pairings) to a whitespace amount. Nonetheless, based on the description herein, persons of ordinary skill in the art will recognize implementations in which whitespace, though dependent on recognized language content and scaled or modulated based on display considerations, is encoded explicitly in a token stream or other program representation. Recognizing the diversity of available design alternatives, the description that follows focuses on functional flows, rather than particular representation formats.

Language-Sensitive Whitespace Adjustment

Some embodiments in accordance with the present invention extend the above-described display capabilities by permitting dynamic adjustments to be made to a horizontal whitespace computation. In general, the adjustments may be made either automatically or under user control. Adjustments may apply to all lines in a particular view (multiple views are typically permitted) or to particular lines within a particular view.

Figure 2:
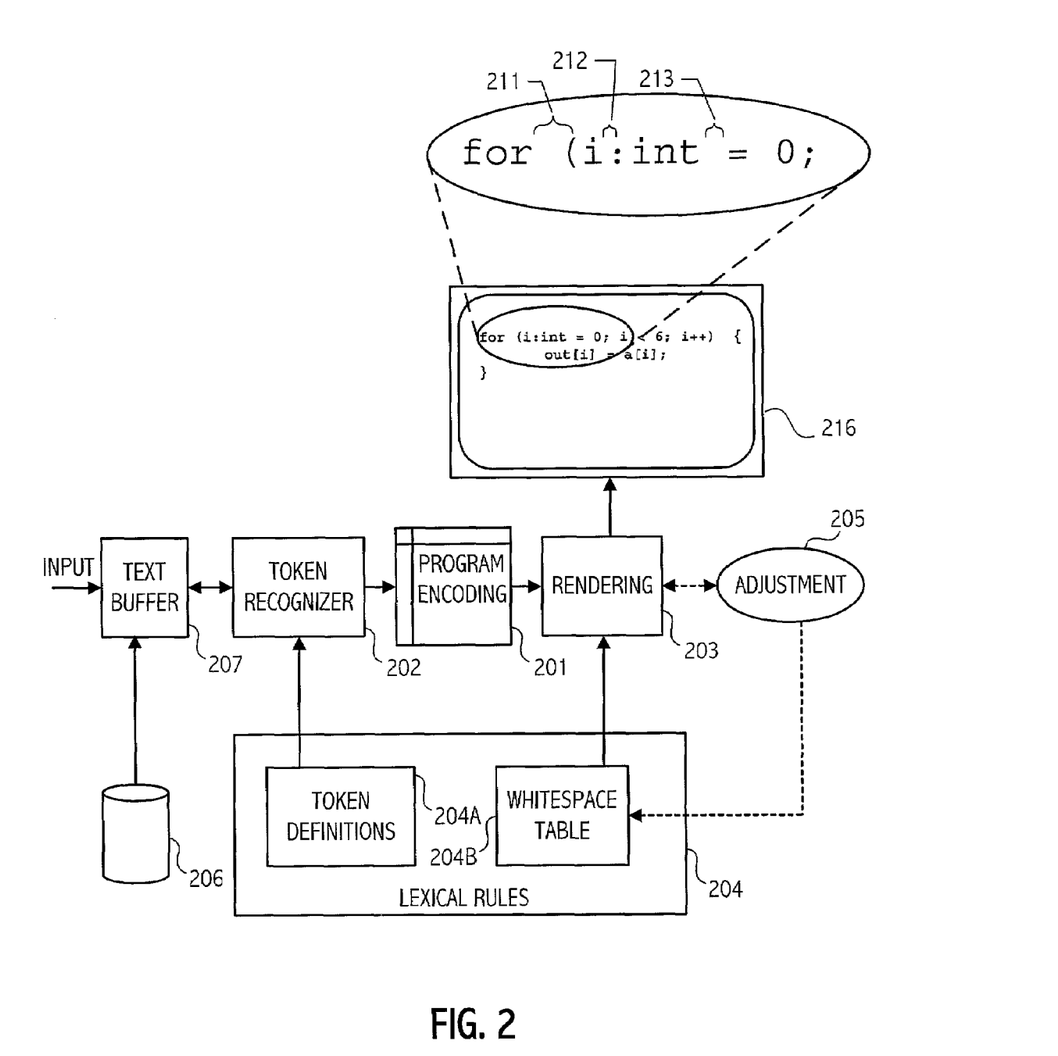
FIG. 2 depicts functional components of an adjustable whitespace embodiment of the present invention.

FIG. 2 depicts relevant functional components of an interactive software engineering tool that provides adjustable whitespace in accordance some embodiments of the present invention. Using a machine-readable representation of textual content (e.g., encoding 201 of program code) for which language features have been coded (e.g., through lexical analysis 202, syntactic analysis or a combination of both lexical analysis and syntactic analysis), rendering engine 203 applies predetermined language-oriented whitespace rules 204b to the encoding of textual content. FIG. 2 illustrates one configuration in which an input stream (e.g., user keystrokes) together with information (e.g., a stored program) from storage 206 contributes to the state of text buffer 207 from which, in turn, language tokens are recognized. Whitespace rules are then applied in the rendering of the recognized tokens. Other configurations which provide an encoding in which language and/or semantic features have been recognized are also suitable. In general, any of a variety of lexer or parser technologies may be employed, whether as part of an editor or code development environment or as preprocessing or external processing that results in the encoding in which language and/or semantic features have been recognized.

Recognizing the range of suitable variations, the illustrative configuration of FIG. 2 is now further described. Absent adjustment 205, the illustrated configuration provides, on display 216, a rendering of textual content corresponding to contents of text buffer 207 and program encoding 201 using default language sensitive whitespace rules. Accordingly, the rendered width of whitespace 211, 212 and 213 is dependent on the particular language features of the rendered textual content. Typically, types or classes of adjacent tokens determine the appropriate whitespace although more complex determinations can also be employed.

By providing adjustment 205, the language sensitive whitespace that is otherwise determined (e.g., in accordance with whitespace rules 204B) is scaled or modulated in accordance with the desired adjustment. Accordingly, the rendered width of whitespace 211, 212 and 213 is actually dependent both on the particular language features of the rendered textual content and the adjustment. Typical sources of adjustment include the user himself/herself and automatic layout mechanisms of rendering engine 203.

Figure 3A:
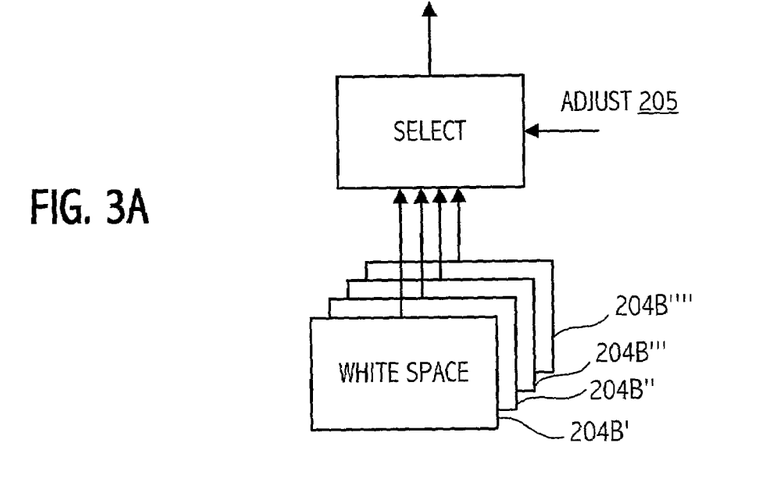
FIGS. 3A, 3B and 3C depict some illustrative design alternatives for scaling or modulating a language sensitive whitespace amount.
Figure 3B:
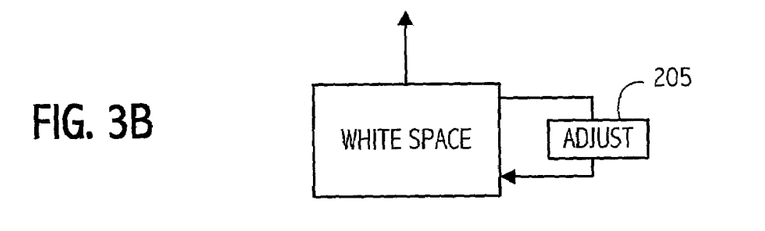
Figure 3C:
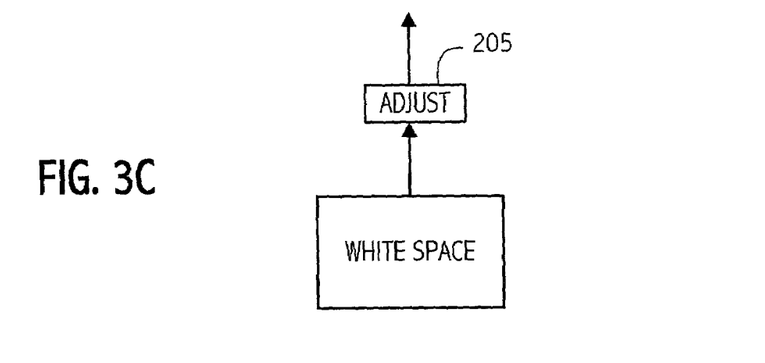

While any of a variety of adjustment mechanisms may be employed, FIGS. 3A, 3B and 3C illustrate three major design approaches. For example as illustrated in FIG. 3A, adjustment 205 may take the form of a selection from amongst a set of predetermined whitespace rule sets (e.g., whitespace rules 204B', 204B", 204B''' and 204B''''). Alternatively, adjustment 205 may take the form of a modification to a current operative set of whitespace rules as illustrated in FIG. 3B. Similarly, whitespace amounts dictated by whitespace rules may simply be adjusted to correspond to a desired scaling. Whatever the design approach, the result includes application of an operative scaling or modulation to the language sensitive whitespace computation.

Figure 4A:
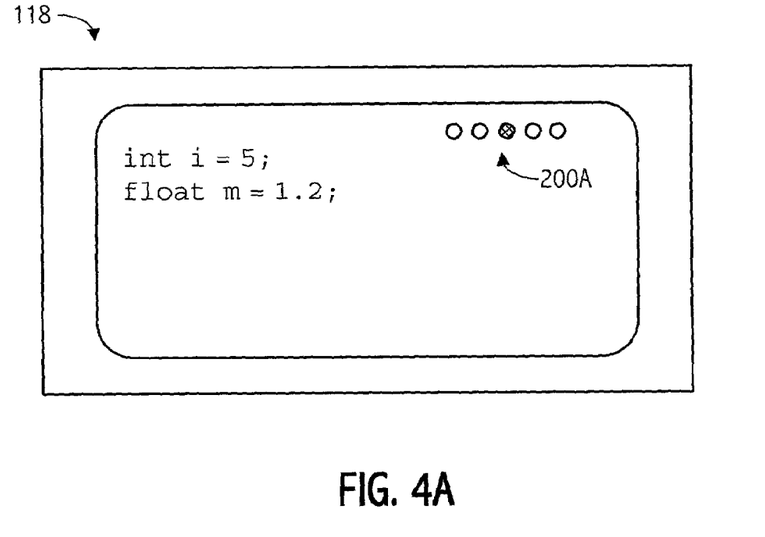
FIGS. 4A and 4B depict illustrative screen display presentations that correspond to respective scalings in one user-preferences driven embodiment of the present invention.
Figure 4B:
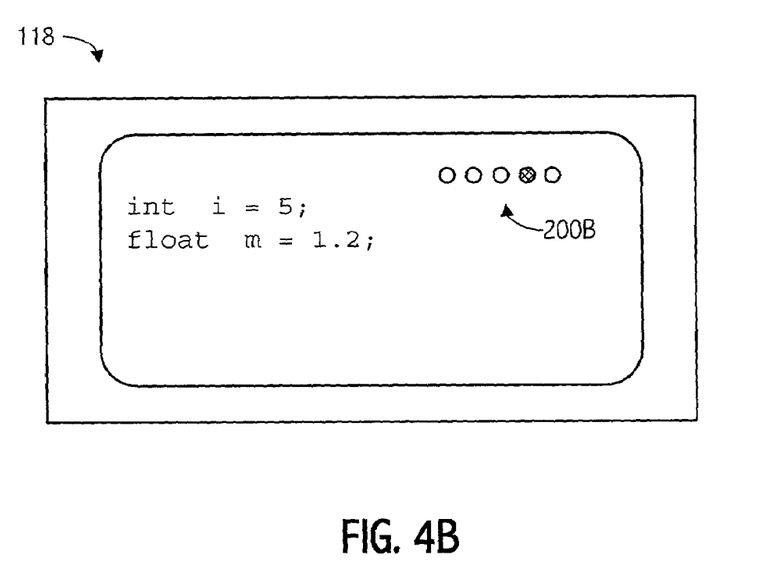

In a simple realization, the user is offered a control mechanism associated with each view that permits adjustment to the language-sensitive horizontal spacing. A number of choices may be offered, ranging from very small spacing (language tokens packed very densely) to very large spacing (language tokens widely separated). In some presentations, a clearly identified default setting may be provided. Typically, the default setting is the preferred spacing for the particular set of style rules being used. FIGS. 4A and 4B illustrate a screen display 118 in which the effect of two different adjustment selections (adjustment selection 200A and 200B, respectively) are illustrated. Note that the effect of selection 200B is somewhat exaggerated for purposes of illustration.

A more complex realization applies an adjustment separately to each line in a view. As before, the adjustment may be placed under control of the user. However, such line-by-line adjustment is more likely placed under control of the automatic layout mechanism, for example, to adjust the length of particular lines for a reason such as optimizing layout when long lines are being automatically broken or folded. Note that aspects of both user and automatic adjustment realizations may coexist. For example, a user may select a preferred horizontal density of tokens, but the result may subsequently be modulated on particular lines by another layout mechanism.

Although suitable selections of whitespace amounts and modulations may trace to any of a variety sources including ad hoc selections of whitespace and empirically determined scalings, one presently preferred source of human factors oriented data for horizontal whitespace follows guidelines for visual styles described in Ronald M. Baecker and Aaron Marcus, Human Factors and Typography for More Readable Programs, ACM Press, 1990, pp. 334. Embodiments in accordance with the present invention may employ any of a number of sources of whitespace data or computations with further adjustment (e.g., dynamically, each time a line is displayed) by an additional scaling factor that may be changed by a user or under automatic control.

In some realizations, the selected factor scales whitespace linearly. Linear scaling coefficients are typically determined empirically, based on the visual effect of each. In some realizations, the scaling factor may be non-linear, taking into account the non-linearity of human visual perception. Likewise, the set of scaling factors presented to the user could be computed automatically. In yet another realization, the choice of scaling factors may be presented to the user as a linear scale, rather than discrete choices, for example using conventional "slider" controls for a graphical toolkit. Based on the description herein, persons of ordinary skill in the art will appreciate any of a variety of user interface designs.

While the invention has been described with reference to various embodiments, it will be understood that these embodiments are illustrative and that the scope of the invention is not limited to them. Many variations, modifications, additions, and improvements are possible. In particular, a wide variety of lexical contexts may be supported. For example, while a lexical context typical of program code has been illustrated, other lexical contexts such as those appropriate to markup languages, comments, even multimedia content may be supported. Similarly, although much of the description has focused on functionality of an editor, the techniques described herein may apply equally to other interactive or even batch oriented tools. While lexical analysis of textual content has been presumed in many illustrations, persons of ordinary skill in the art will recognize that the techniques described herein also apply to structure-oriented editors and to implementations that provide syntactic, as well as lexical, analysis of content.

More generally, plural instances may be provided for components described herein as a single instance. Boundaries between various components, operations and data stores are somewhat arbitrary, and particular operations are illustrated in the context of specific illustrative configurations. Other allocations of functionality are envisioned. Structures and functionality presented as discrete in the exemplary configurations may be implemented as a combined structure or component. These and other variations, modifications, additions, and improvements may fall within the scope of the invention as defined in the claims that follow.

What is claimed is:

1. A software engineering tool that recognizes language tokens and computes for display whitespace amounts between adjacent instances thereof according to language-specific style rules, the software engineering tool further providing, for at least a grouping of those language tokens displayed, dynamic adjustment of the computed whitespace amounts in accordance with an operative scaling factor therefor.

2. The software engineering tool of claim 1,
wherein the dynamic adjustment is performed in response to selection of the operative scaling factor by a user of the software engineering tool.

3. The software engineering tool of claim 1,
wherein the dynamic adjustment is performed under control of an automated layout mechanism.

4. The software engineering tool of claim 1, wherein the operative scaling factor includes one or more of:
a linear scaling of the whitespace amounts; and
a non-linear scaling of the whitespace amounts.

5. The software engineering tool of claim 1, wherein the operative scaling factor is selectable in one of:
continuous units; and
discrete units.

6. The software engineering tool of claim 1,
wherein the operative scaling factor is selected to conform display of the grouping of language tokens to one or more dimensions of a particular view thereof.

7. The software engineering tool of claim 1, wherein the grouping of language tokens for which the dynamic adjustment is provided is one of:
a line thereof;
plural lines thereof;
all lines of a particular view thereof; and
only particular lines of the particular view thereof.

8. The software engineering tool of claim 1, configured as one or more of:
an editor;
a source level debugger;
a class viewer;
a profiler; and
an integrated development environment.

9. The software engineering tool of claim 1, embodied as software encoded in one or more computer readable media and executable on a processor.

10. The software tool of claim 1, wherein the language-specific style rules include style rules in accordance with lexical type of language tokens.

11. A method of presenting textual content that includes a sequence of tokens recognizable in accordance with a predefined language model, the method comprising:

calculating whitespace amounts for visual presentation between adjacent pairs of recognized tokens, wherein the calculated whitespace amount for visual presentation between a first pair of the tokens differs from that between a second pair of the tokens, each in accordance with language-specific style rules; and for at least a subset of the token sequence, applying an operative scaling factor in the calculating of respective ones of the whitespace amounts.

12. The method of claim 11, recognizing the tokens based on the predefined language model; and performing the calculation of respective whitespace amounts based on a property of one or more adjacent ones of the recognized tokens.

13. The method of claim 12, wherein the property includes a token-type-specific leftward or rightward white space amount.

14. The method of claim 11, displaying the visual presentation, including the scaled whitespace amounts, as editable textual content.

15. The method of claim 11, rendering the visual presentation, including the scaled whitespace amounts, as viewable textual content.

16. The method of claim 11, wherein the operative scaling factor is selected by a user of a software engineering tool that implements the method.

17. The method of claim 11, further comprising:

displaying or rendering the visual presentation, wherein the operative sealing factor is selected under control of an automated layout mechanism.

18. The method of claim 11, wherein the operative scaling factor is linear.

19. The method of claim 11, wherein the operative scaling factor provides non-linear scaling of the whitespace amounts.

* * * * *

UNITED STATES PATENT AND TRADEMARK OFFICE
CERTIFICATE OF CORRECTION

PATENT NO.         : 7,117,479 B2
APPLICATION NO. : 09/968932
DATED              : October 3, 2006
INVENTOR(S)        : Michael L. Van De Vanter It is certified that error appears in the above-identified patent and that said Letters Patent is hereby corrected as shown below:

On Title Page (56)
Page 2 Col. 2 (Other Publications); Line 26; Delete "Reports" and insert -- Report --, therefor.

On Title Page (56)
Page 2 Col. 2 (Other Publicaitons); Line 41; Insert -- 8th -- before "Conference".

Column 10; Line 16; In Claim 17, delete "sealing" and insert -- scaling --, therefor.

Signed and Sealed this

Tenth Day of April, 2007

JON W. DUDAS
*Director of the United States Patent and Trademark Office*